UNITED STATES PATENT OFFICE.

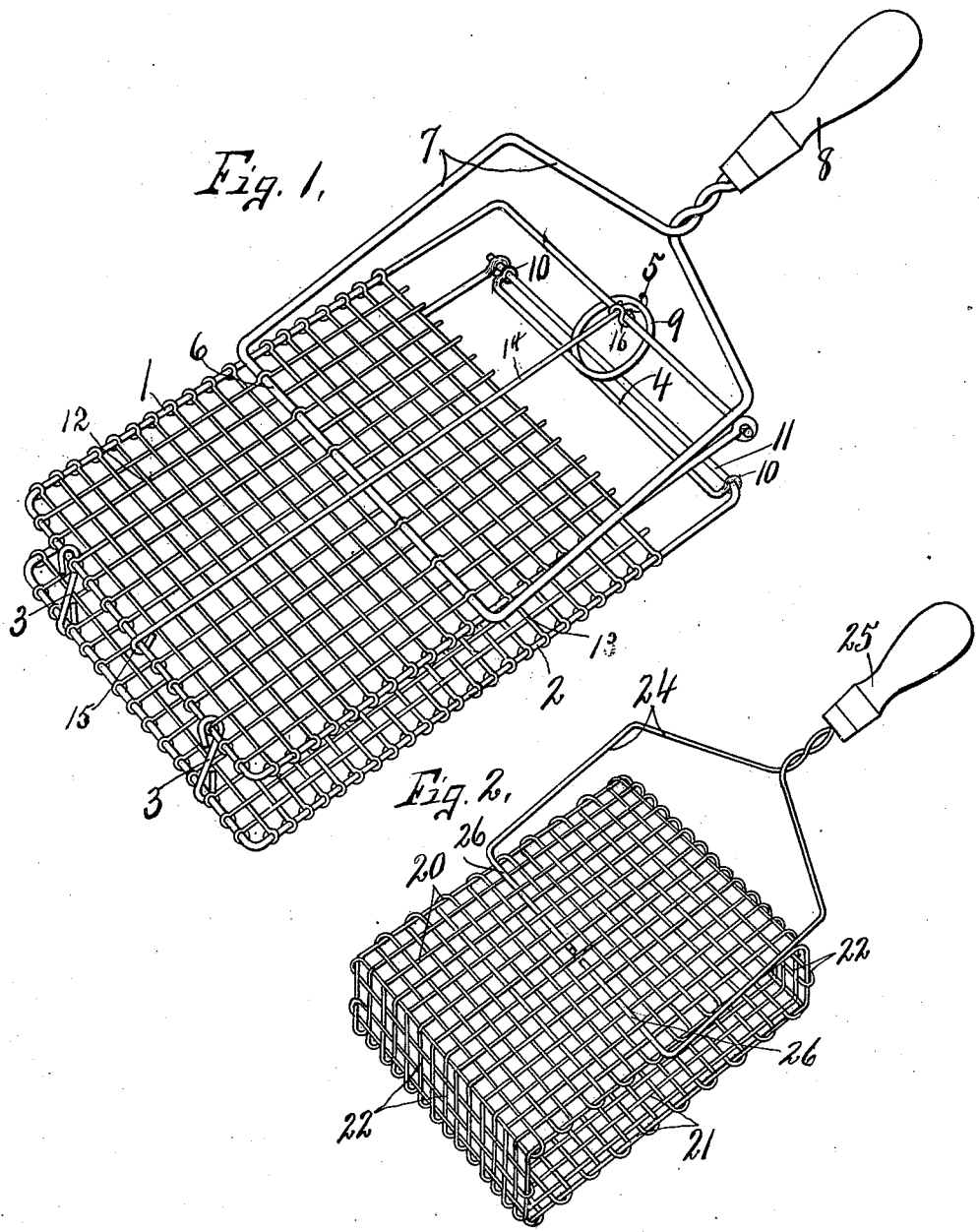

S SPENCER ECCLESTON, OF SYRACUSE, NEW YORK, ASSIGNOR OF ONE-HALF TO GURNSEY B. WILLIAMS, OF SYRACUSE, NEW YORK.

BROILER.

No. 861,168.  Specification of Letters Patent.  Patented July 23, 1907.

Application filed January 26, 1907. Serial No. 354,248.

*To all whom it may concern:*

Be it known that I, S SPENCER ECCLESTON, of Syracuse, in the county of Onondaga, in the State of New York, have invented new and useful Improvements in Broilers, of which the following, taken in connection with the accompanying drawings, is a full, clear, and exact description.

This invention relates to certain improvements in broilers which are also adapted to be used as bread-toasters, and comprises essentially two flat woven wire sections connected together and supported by a wire bail having a portion thereof passed transversely over and under the wires of one of the sections forming a frictional hinge connection upon which the broiler or toaster swings between the side arms of the bail.

One of the objects of the invention is to hinge one of the toaster sections to the bail so as to be capable of being inverted thereon for broiling or toasting opposite sides of meat, bread or other eatables.

A further object is to utilize portions of the wires of one of the sections as a frictional connecting medium and its supporting bail whereby the broiler sections may be tilted or inverted and retained in their adjusted inverted position by friction with the portion of the bail connected thereto.

In the drawings—Figure 1 is a perspective view of the preferred form of my invention, in which the broiler sections are hinged to swing one upon the other as well as upon its supporting handle bail. Fig. 2 is a similar perspective view of a modified form of a broiler or toaster in which the ends of the upper and lower broiler sections are permanently united in fixed relation to each other. Fig. 3 is a detail transverse sectional view through one of the woven wire broiler sections seen in Fig. 1, at its junction with the supporting bail.

In Fig. 1 the broiler is shown formed of two rectangular frames, 1—2, of wire, and each frame provided with a web of woven wire represented respectively at 12—13, the web extending preferably for a portion of the length of the frame, leaving the frames at one end extending beyond the web portions, thus leaving a portion of the frames unprovided with the web structure. The frames 1—2 are connected at one end by links 3, the links serving to hold the frames with their web coverings spaced apart. A wire brace 14 is connected at one end by a loop 15 extending around one of the end members of the frame 1, while the opposite end of the brace is looped at 16 around the opposite end member of the same frame and extending into a hook 5 in advance of the frame member. The hooked end of the brace is disposed adjacent to the end of the frame 1 which is not provided with the web, as shown, and connected to the adjacent end member 11 of the frame 2 is a catch device formed of a single piece of wire 4 looped at its ends 10—10 around the end member 11 close to the sides of the frame and bent into a relatively large loop 9 at the center, the loop 9 adapted to be engaged with the hook 5, by which means the two frames 1—2 are detachably coupled at the ends opposite the links 3—3. The links 3—3 and the loops 9 are of substantially the same length, so that when the two frames with their web portions attached are connected together, they will be spaced at uniform distances apart, as shown in Fig. 1. A handle device is connected to the frame 1 and its web portion 12, the handle consisting of a rectangular bail 7 formed of a single piece of wire with one end 6 woven through the strands of the web portion 12, as shown, and with a handle 8 connected to the other end. The handle frame or bail is thus free to swing upon the section 1, and the rectangular portion 7 will be large enough to permit the two sections to rotate completely within the bail, so that either side of the broiler may be disposed respectively to the fire, so that both sides of the meat or other substance or material held by the web sections may be presented to the fire. This rod —6— is preferably round in cross section and is passed transversely over and under the lengthwise wires of the web portion 12 alternately and substantially midway between the ends of said section. By passing this rod —6— transversely over and under alternate lengthwise wires of the web 12, a frictional connection is established with the bail which while permitting the broiler to be turned on the rod —6— also causes the wires of the web portion 12 to grip said bail with sufficient friction to hold the broiler in its adjusted position. The links —3— which are pivotally connected to the adjacent ends of the frames 1 and 2 and serve to flexibly tie said ends together to permit the sections of the broiler to be adjusted a limited distance toward and from each other, and the locking members —4— and —5— at the opposite end serve a similar purpose. The ring or loop —9— is, therefore, detachably engaged with the hook —5— to hold the sections of the broiler in substantially parallel planes, but when it is desired to insert a slice of meat or bread between said sections, the loop —9— may be readily disengaged from the hook —5— permitting the upper section to be rocked upon the links —3—, after which said upper section may be returned and locked in its operative position.

In Fig. 2 I have shown a modified form of the broiler consisting of substantially parallel woven wire sections —20— and —21— which are united at their front and rear ends by woven wire ends —22— which hold the sections —20— and —21— a convenient distance apart in fixed relation to each other, forming a hollow rectangular frame open at the sides for the reception of the material to be treated. In this latter device the sections are supported upon a suitable bail —24— similar to the bail —7— and which is provided with a handle —25—. This bail 24 is preferably made in the form of a rectangular frame of wire having inwardly and laterally projecting ends —26— which are passed transversely over and under the lengthwise wires of the section —20— substantially midway between its ends and upon which the broiler is adapted to turn, the area of the openings between the sides and ends of the bail —24— being sufficient to permit the ends of the broiler to be swung or tilted therefrom.

The operation of my invention will now be readily understood upon reference to the foregoing description and accompanying drawings, and it will be seen that the essential feature of novelty lies more particularly in construction of the device as heretofore described and as defined by the accompanying claims.

What I claim is:

1. A broiler substantially as described, comprising two rectangular frames of wire spaced apart and provided with woven wire webs, means for hingedly uniting said frames at one end, a wire brace connected centrally to one end member of one of said frames with the brace extending into a hook at the other end, a coupling device comprising a wire formed into a central loop with the ends extended laterally and coiled around the adjacent end member of the other frame, said loop adapted to detachably engage said hook when the frames are in closed position.

2. A broiler substantially as described, comprising two rectangular frames of wire spaced apart and provided with woven wire webs, means for hingedly uniting said frames at one end, a wire brace connected centrally to one end member of one of said frames with the brace extended into a hook at the other end, a coupling device comprising a wire formed into a central loop with the end extended laterally and coiled around the adjacent end member of the other frame, said loop adapted to detachably engage said hook when the frames are in closed position, and a handle bail formed from a rectangular frame of wire with one of its members woven through one of said webbing members and with a handle extending from the opposite end.

In witness whereof I have hereunto set my hand this 22d day of January 1907.

S SPENCER ECCLESTON.

Witnesses:
M. M. NOTT,
HOWARD P. DENISON.